W. R. THOMPSON & E. E. CASE.
PUMP.
APPLICATION FILED FEB. 14, 1910.
984,320.
Patented Feb. 14, 1911.
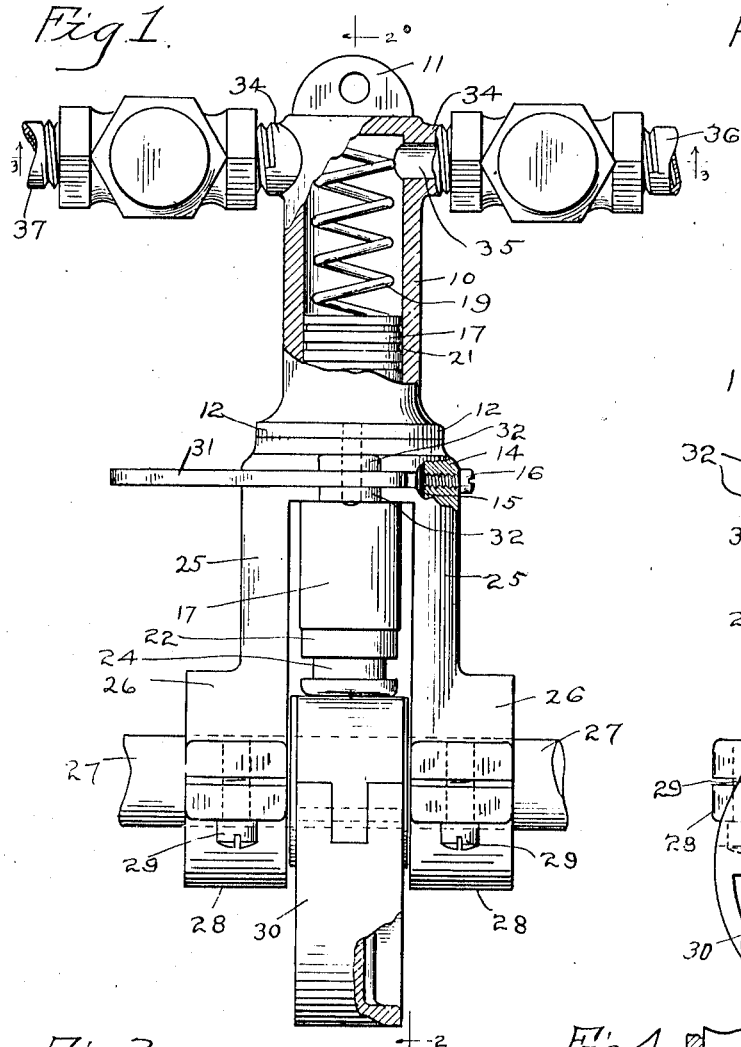
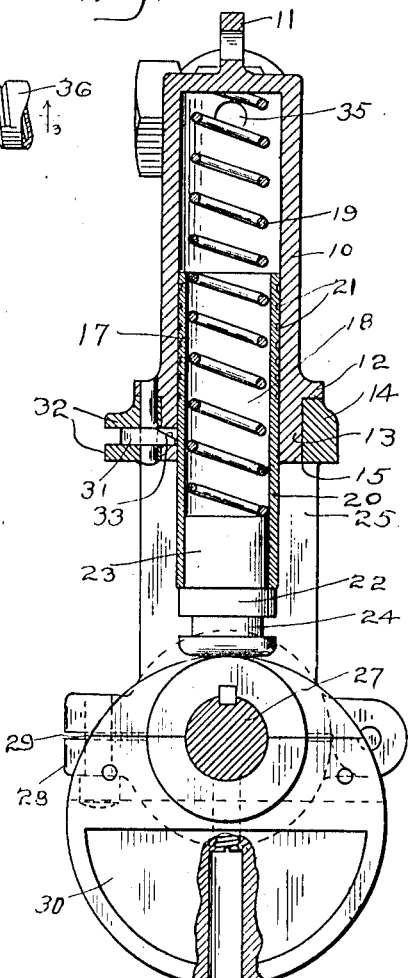
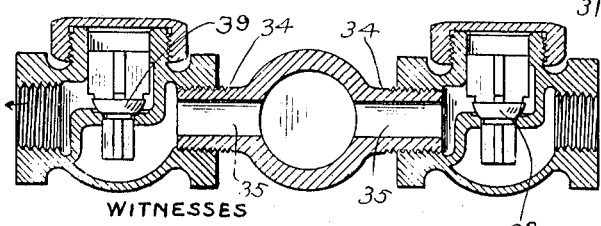
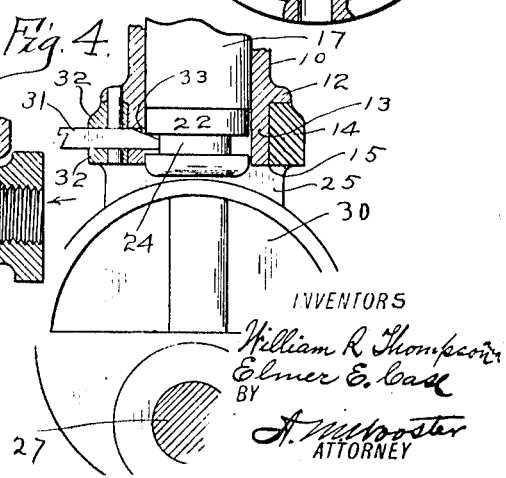
WITNESSES
Ernst P. Wold
S. W. Atherton
INVENTORS
William R. Thompson
Elmer E. Case
BY
A. Wooster
ATTORNEY

UNITED STATES PATENT OFFICE.

WILLIAM R. THOMPSON AND ELMER E. CASE, OF SOUTH NORWALK, CONNECTICUT, ASSIGNORS OF ONE-HALF TO JOHN TIEBOUT, OF NEW YORK, N. Y.

PUMP.

984,320. Specification of Letters Patent. Patented Feb. 14, 1911.

Application filed February 14, 1910. Serial No. 543,684.

*To all whom it may concern:*

Be it known that we, WILLIAM R. THOMPSON and ELMER E. CASE, citizens of the United States, residing at South Norwalk, county of Fairfield, State of Connecticut, have invented an Improvement in Pumps, of which the following is a specification.

This invention has for its object to provide a simple, compact, light and inexpensive pump adapted for general use, which can be readily attached to any shaft without disturbing the shaft and as readily removed therefrom and which may be easily locked out of operation without removing it from the shaft.

With these and other objects in view we have devised the novel pump of which the following description in connection with the accompanying drawing is a specification, reference characters being used to indicate the several parts:

Figure 1 is an elevation, partly in vertical section, showing the pump as applied to a shaft as in use; Fig. 2 a vertical section on the line 2—2 in Fig. 1, looking in the direction of the arrows; Fig. 3 a transverse section on the line 3—3 in Fig. 1, looking in the direction of the arrows; and Fig. 4 is a section corresponding with Fig. 2, showing the piston at the extreme of its forward movement and locked out of engagement with the eccentric.

10 denotes the cylinder which is closed at one end, is provided at its closed end with an eye 11 for convenience in attaching in place, and at its open end with a flange 12 and a hub 13. The flange rests upon a body 14 which is provided with an opening 15 to receive the hub. The cylinder is rigidly secured to the body in any suitable manner as by means of a set screw 16 in the body which engages the hub.

17 denotes the piston which is closed at one end and is provided with a central opening 18 to receive a spring 19 which bears against the closed end of the piston and against the closed end of the cylinder. The piston as preferably constructed comprises a piece of tubing, indicated by 20, shown as provided with oil grooves 21, at the end of which is a head or plug 22. This head is shown as provided with a hub 23 which passes into the end of the tube and is brazed or otherwise rigidly secured thereto and with a groove 24 for a purpose presently to be explained.

25 denotes arms extending from the body which are provided with bearings 26 for a shaft 27. Each bearing has hinged thereto a cap plate 28, the free ends of the cap plates being secured to the bearings by screws 29, thus permitting the pump to be readily attached to and detached from a shaft.

30 denotes the eccentric which lies between the bearings and is adapted to engage the head of the piston, which is shown as rounded. In order that the eccentric also may be readily attached to or detached from the shaft, it is shown as made in two parts which are tongue-and-grooved together, as shown, and are rigidly secured to each other and to the shaft.

31 denotes a locking lever which is pivoted between ears 32 on the body and is provided with a cam incline 33 which is adapted to pass through a slot in hub 13 and engage groove 24 in the head of the piston and to lock the piston out of operative position. When the eccentric is in the position shown in Fig. 4 and the piston is at the extreme of its forward movement against the power of the spring, if the locking lever is swung to the locking position the cam incline will engage the upper wall of the groove and continued movement of the locking lever will lift the piston wholly out of engagement with the eccentric, as clearly shown in Fig. 4, so that the shaft may be run without affecting the pump, there being no clicks or blows as the eccentric cannot touch the piston.

At the upper end of the cylinder are threaded hubs 34 having central openings 35 for the passage of water.

36 denotes the supply pipe and 37 the discharge pipe. Between the supply pipe and the cylinder is a suitable induction valve 38 and between the cylinder and the discharge pipe is a suitable education valve 39.

The operation will be obvious from the drawing. The piston is forced forward by the eccentric and is forced backward by the spring. When the piston is moving backward, water will enter the cylinder through the supply pipe, the eduction valve being closed, and when the piston is moving forward the induction valve will be closed and the water will be forced out through the discharge pipe. To stop the action of the pump without stopping the shaft, it is simply necessary to swing the locking lever into operative position as in Fig. 4. To remove the pump it is simply necessary to disconnect the discharge and supply pipes and to remove the screws which hold the cap plates of the bearings in place. The eccentric likewise being made in two parts may be readily removed from the shaft if required.

Having thus described our invention we claim:

A pump of the character described comprising a body provided with an opening, a cylinder closed at one end and open at the other, said open end being provided with a hub to enter the opening in said body and a flange to rest on the latter, said hub being slotted, said body being provided with ears, a piston formed of a tubular sleeve, a plug closing the lower end of said piston and provided with a circumferential groove, a spring passed through said sleeve, one end of said spring resting against said plug, the other end bearing against the closed end of said cylinder, a locking lever mounted between said ears and having an end adapted to pass through the slot in the hub of said cylinder and to engage the groove of said plug, and means for moving said piston in opposition to the pressure of said spring.

In testimony whereof we affix our signatures in presence of two witnesses.

WILLIAM R. THOMPSON.
ELMER E. CASE.

Witnesses:
   FRED H. MADDEN,
   E. PRICE.